May 25, 1954

R. A. BROWN ET AL 2,679,618

LIGHT PULSE PRODUCING CIRCUIT

Filed Aug. 27, 1952

INVENTORS
FRANCIS G. DuPONT
ROBERT A. BROWN
BY
John H. Lewis Jr.
ATTORNEYS

May 25, 1954  R. A. BROWN ET AL  2,679,618
LIGHT PULSE PRODUCING CIRCUIT
Filed Aug. 27, 1952  3 Sheets-Sheet 2

INVENTORS
FRANCIS G. DuPONT
ROBERT A. BROWN
BY
ATTORNEYS

INVENTORS
FRANCIS G. DuPONT
ROBERT A. BROWN
BY
ATTORNEYS

Patented May 25, 1954

2,679,618

UNITED STATES PATENT OFFICE 2,679,618

LIGHT PULSE PRODUCING CIRCUIT

Robert A. Brown, Milford, and Francis G. Du Pont, Fairfield, Conn., assignors to Remington Arms Company, Inc., Bridgeport, Conn., a corporation of Connecticut Application August 27, 1952, Serial No. 306,635

14 Claims. (Cl. 315—183)

1

This invention relates to an electrical circuit intended to be used with gaseous flash tubes to produce from such flash tubes a light pulse having an intensity/time relationship matching the requirements of a particular camera or photographic system.

A number of highly useful ultra high speed camera systems have been proposed which have excellent characteristics in regard to uniformity of light transmission, but which require complicated shuttering devices. One of the most effective of such systems utilizes stationary film and a multi-aperture scanning grid, while others employ various modifications of rotating mirror or rotary drum scanning. If any of these systems are to be utilized for recording other than self-luminous phenomena, an auxiliary shutter system is required to initiate and terminate the period in which the event is being recorded. If such an auxiliary shutter system is mechanical in character, it must be accurately synchronized, both with the event to be recorded and with the scanning system. Further, such a system should both open and close substantially without delay and have substantially constant transmission characteristics during the open period, characteristics which cannot be supplied in any mechanical system. Electro-optical or magneto-optical shuttering devices such as the Kerr cell or Faraday cell have been used but are generally unsatisfactory because of their poor transmission characteristics and/or the fairly high amount of light absorbed by such systems.

The design of such ultra high speed cameras can be greatly simplified by eliminating a capping shutter, and the elimination of a capping shutter is practical if a light source is provided which rises to its peak value substantially instantaneously, remains at substantially peak intensity for the full duration of the period, and drops off to zero substantially instantaneously. In other words, what is needed for this type of use is a true square wave light pulse, and the production of such a pulse is an object of our invention.

The sharply peaked light pulse of gaseous flash tubes when used in conventional flash circuits has prevented their use for single flash still photography with cameras employing focal plane shutters by any but open flash methods. A light pulse maintaining a substantially uniform value of intensity during at least the full period of travel of the shutter slit would permit the use of ultra high speed focal plane shutters for synchronized electronic flash.

2

For many photographic applications, the "tail" or afterglow of the usual flash tube tends to interfere with the definition of an otherwise sharp photograph produced by a peaked light pulse, and the elimination of such tails is one of the objectives of our invention.

In taking ultra high speed motion pictures of objects approaching or receding over a considerable distance, the effect of the inverse square law is to limit quite seriously the distance at which an object may be rendered visible without resulting in over-exposure when the object is at a position fairly close to the light source. A light source which decreased in effective intensity in direct proportion to the square of the instantaneous distance to an approaching object would permit a uniform exposure throughout the period. For such an application a light source should be capable of being initiated when the object is at a predetermined distance from the light source, after which the light intensity at the source should vary in some determinable ratio to the distance between the object and the source. Obviously, the converse is true for a receding object. Another important objective of our invention is to provide a means by which such control of light intensity may be effected.

In other cases, as in certain examples of ballistic photography, the field is at first clear and then becomes increasingly opaque as the result of smoke, etc., requiring an increasing amount of light to maintain photographic effectiveness. Another example of the need for such techniques is in the silhouette, ultra high speed photography of mushrooming bullets on impact with an initially transparent gelatin block. As the gelatin block is thrown into a condition of oscillation by the bullet impact and penetration, it becomes increasingly effective in the diffusion of the transmitted light upon which we depend for the production of a silhouette photograph.

Certain ultra high speed movie cameras show non-uniform exposure characteristics during their operating cycle, with the result that a lens setting calculated to produce a proper exposure at the average operating condition will result in over-exposure or under-exposure during certain portions of the cycle. With such cameras it would be desirable to have a light pulse having intensity varying with time in the same ratio as the transmission characteristics of the camera vary with respect to time.

For any of these applications it is fairly simple to determine by conventional methods the aceleration characteristic of a camera, the transmission characteristic of an interposed medium, etc., and from these characteristics to plot the desired curve of source intensity with respect to time to compensate for the varying condition and assure uniform photographic results. The major object of our invention is to provide a means of tailoring light pulses to produce a desired photographic result under any condition in which the required light follows a predictable variation in its intensity/time characteristic.

With circuits in which a gaseous flash tube, such as those filled with xenon, has been energized by the charge stored in a capacitor, it has been found that the instantaneous value of intensity of the light emitted by the flash tube is substantially directly proportional to the instantaneous current through the tube. We contemplate that we can produce the desired shaping of a light pulse by modifying the impedances of the circuit between the flash tube and the supply capacitor or capacitors to provide a current/time characteristic matching the desired intensity/time characteristic. If, for example, we provide a current/time characteristic rising very sharply to a maximum value which is maintained for the desired time, we can modify such a pulse into a square wave pulse by the provision of a suitable shunt device capable of diverting from the flash tube the full remaining charge in the supply capacitor at the expiration of the desired time and before the current has dropped substantially below its average value.

Similarly, the choice of circuit impedances having other current/time characteristics, such as one of current increasing with respect to time, will produce a light pulse having a similar intensity/time characteristic.

An elementary study of transient electrical phenomena reveals that completion of a circuit including only a charged capacitor and resistive elements results in a theoretical instantaneous arrival at a value of peak current determined by the expression $$I=\frac{E}{R}$$

where E is the charge on the capacitor and R is the total resistance in the series circuit, followed by an exponential decay of current as the capacitor discharges at a rate determined by the RC constant of the system. The apparently finite rise time shown in oscillographic records of the discharge through such a circuit including a flash tube as one of the resistive elements is mainly the result of the peculiar characteristics of a flash tube when current is being initiated. After conduction has been started, and within practical limitations, a gaseous flash tube may be considered as a resistive element, although it must be noted that its apparent actual resistance does still decrease materially during the discharge cycle, probably as a function of instantaneous applied voltage which is varying as the supply condenser discharges and perhaps as a function of the heating of elements of the tube. We have observed that with the General Electric flash tubes FT–503 this variation usually levels off after the tube has been conducting for about 300 microseconds.

A similar elementary study reveals that a circuit containing a capacitor, an inductor, and a resistor tends to oscillate in a damped sine wave whose characteristics are determined by the values of L, R, and C.

We propose to use several supply capacitors in parallel, each of such capacitors being in series with the desired combination of impedance elements such that the total current delivered to the flash tube by the several capacitors will have the desired current/time relationship. For example, two or more supply capacitors may be employed, one in series with only resistive elements to provide a high initial current, and the others in series with primarily inductive elements to provide sustained current during the exponential decay of current in the resistive leg. In the simplest cases we have found two supply capacitors adequate to provide a substantially square wave light pulse as well as several other pulse shapes.

In considering the functioning of such a network for controlling the discharge of a flash tube, it will be found adequate to examine a time period of only slightly longer than the first quarter cycle of the oscillatory surge of discharge current, because such a time period involves the major portion of the original energy initially stored in the capacitors. Obviously the discharge current surge passing through an inductor is characterized by that parameter of the circuit, rising to a maximum value, and then decaying in a manner similar to the damped sine wave, while the characteristic discharge surge of current through a resistor begins at a maximum value and decays exponentially. We have found that for any given pair of supply capacitors in a parallel network, we can determine values of R and L such that the rise in current through the inductor is offset to the desired extent by the drop in current through the resistor, and for the first quarter cycle of the damped wave we can maintain the desired relationship of current with respect to time. At the peak of the first quarter cycle of the damped wave, the current in both branches of the network is falling and, if the desired relationship is not to be disturbed by a "tail" of light, the remaining current must be abruptly diverted from the flash tube by means which will later be more fully discussed.

Experimental data indicate that gas-filled flash tubes do not ionize or start conduction immediately upon the application of a trigger pulse. Instead, there is a time delay which may approach 100 microseconds, as with the flash tube FT–503, but which is for any given flash tube and ignition circuit a relatively constant value which may be readily compensated for in the synchronization of equipment.

Upon the expiration of this delay or ionization period, the current in the resistive supply network rises substantially instantaneously, usually in less than 10 microseconds, to a peak value which is inversely proportional to the total series resistance in ohms except for variations due to the fact that a fixed value of resistance may not be assigned to the flash tube. With flash tube FT—503 operating from 50 microfarads charged to 4500 volts, the series resistance of the flash tube seems to vary from about 4.5 to 7 ohms or more, exhibiting the higher values of apparent resistance when the current is limited to lesser values by external resistance.

Similarly, the current supplied in an inductive network commences to flow upon ionization of the flash tube and flows in a damped sine wave characteristic of the discharge current surge of a condenser through an inductance. The time after the tube is ionized to the peak of the first quarter cycle of the wave is substantially directly proportional to the magnitude of the inductance, and the peak value of current is substantially inversely proportional to the total series impedance, which impedance consists of the inductive reactance of the inductor, the constant resistance of the circuit elements, and the variable resistance of the flash tube previously noted. With the FT-503 flash tube operating from a capacitance of 50 microfarads charged to 4500 volts, it has been noted that the time, after ionization, to reach peak current can be predicted fairly closely from the observed relationship of 0.612 millihenries per 100 microseconds. Maximum currents from an inductive network will be reached with minimum D. C. resistance in the circuit, while the rate of rise and the actual peak value of the current can be cut down by the deliberate insertion of some D. C. resistance.

It should, therefore, be apparent that the peak value of current from a resistive supply network may be varied as a function of the inserted series resistance and that the peak values of current and the time to reach that current in an inductive supply network are functions of the inserted inductance and inherent or inserted resistance. When the currents from combinations of two or more of such supply networks are added, it should be apparent that these three variables are sufficient to permit tailoring the resultant total current to match any desired current/time relationship.

Although perhaps over-simplified, the following general rules may be noted. This discussion assumes a circuit including two supply networks in parallel, one primarily resistive in character, and the subscripts R and L are employed to differentiate between currents or component values in the two networks.

For a current pulse of magnitude increasing with respect to time, $L_L$ should be chosen so that the time to reach peak current $I_L$ will not be less than, and frequently somewhat greater than, the desired duration of the pulse. $R_R$ should be relatively high with respect to $L_L$ and $R_L$ so that the initial or peak $I_R$ is less than the maximum $I_L$ and so that $I_R$ decays exponentially at a slower rate than $I_L$ increases toward peak current.

For a current pulse of magnitude decreasing with respect to time, $L_L$ should be chosen so that the time for $I_L$ to reach peak value is not greater than the desired duration of the pulse. $R_R$ should be relatively low with respect to $L_L$ and $R_L$ so that the initial $I_R$ is materially greater than maximum $I_L$, and $I_R$ decays exponentially at a faster rate than $I_L$ is increasing.

For a square wave current pulse or one which maintains a relatively constant magnitude with respect to time and is then abruptly terminated, $L_L$ should be chosen so that the time to reach peak current $I_L$ is substantially equal to the desired duration of the square wave pulse. In this case, $R_R$ should be so chosen with respect to $L_L$ and $R_L$ that the peak $I_R$ is not much greater than the peak $I_L$ and so that $I_R$ decays exponentially at a rate which is about equal to the rate at which $I_L$ is increasing.

In each of the three cases discussed above, it has been assumed that it was desired to abruptly initiate the current pulse at a value which would produce a photographically effective light pulse. For such abrupt initiation, it is essential that the resistive supply network be kept as nearly as possible free from inductive components. Where more gradual initiation may be tolerated, or is desired, a purely resistive network may be eliminated and one or more inductive networks, suitably damped with series resistance, utilized to develop the desired pulse shape.

For use with cameras, which accelerate relatively slowly to their maximum speed, it is contemplated that two or more supply capacitors including primarily inductive elements can best be used to tailor the shape of the current/time characteristic to match the curve of instantaneous values of frames per second exposure speed with relation to elapsed running time of the camera.

Although exact component values might be difficult to compute rigorously, they are readily determined experimentally. For use with the flash tube FT-503, we have provided, and will later discuss, an exemplary graphical representation from which suitable component values can be selected for a wide range of square wave pulse durations. We will also show exemplary values for light pulses tailored to other conditions.

For those applications where an abrupt termination of flash tube current is required, we contemplate that a tube of high current carrying capacity and low internal resistance may be provided in shunt relation to the flash tube and caused to become conductive to divert the current and eliminate the "tail" or afterglow. For a square wave this diversion should take place before the current has dropped substantially below its peak value. In this way, we may divert substantially the entire current from the flash tube and abruptly terminate that portion of the light therein which is of sufficient brilliance to have any appreciable photographic effect. With such an arrangement, we have found it possible to maintain values of both current and light intensity within a photographically acceptable range of their peak value for periods of time in excess of 1200 microseconds and with rise and extinction times respectively not substantially over 10 microseconds.

The exact nature of the preferred embodiment as well as other objects and advantages thereof, may be more clearly ascertained from the following specification, referring to the attached drawings, in which.

Figures 1, 2, 3:
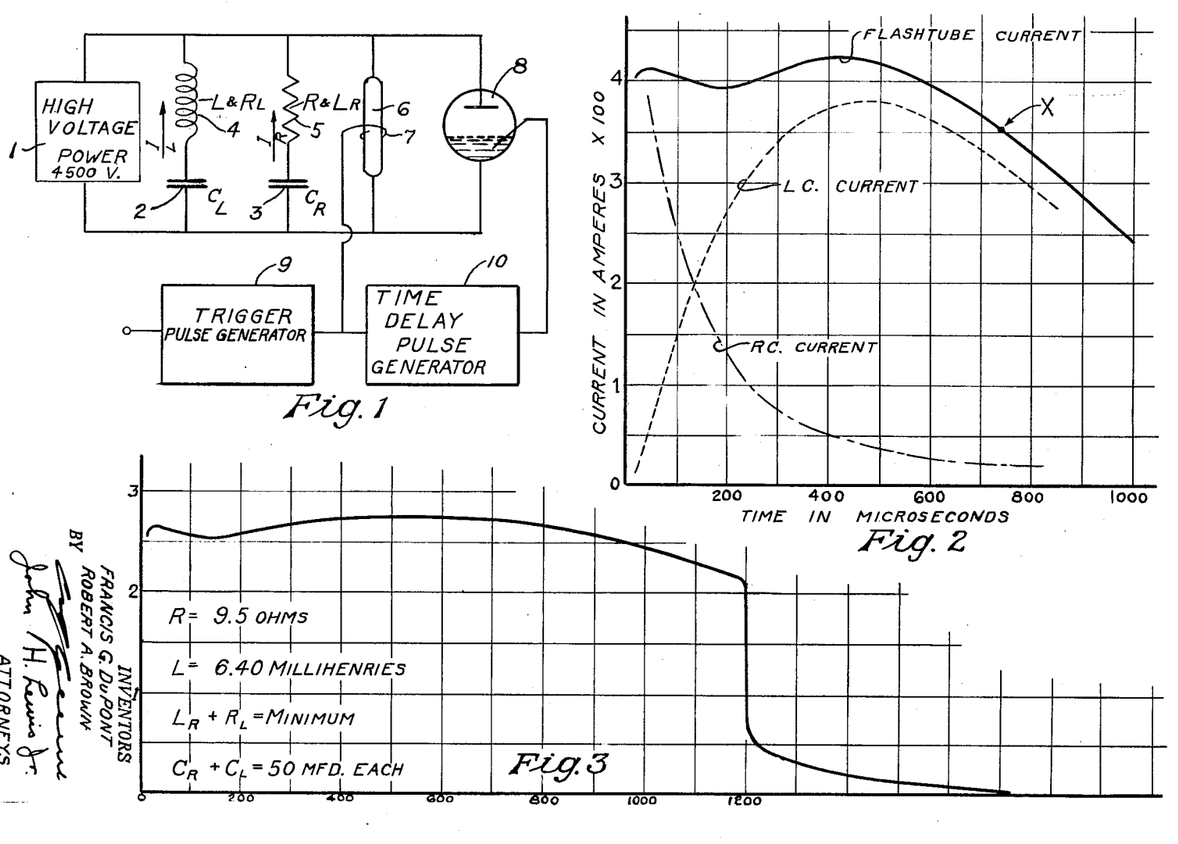
Fig. 1 is a schematic circuit diagram of a light generating system in accordance with our invention.
Fig. 2 is a graph upon which there have been plotted theoretical values of the current supplied by each branch of a supply circuit, such as that of Fig. 1, and a theoretical total current in the flash tube of that figure, these values being those effective during a time period of 1000 microseconds. The circuit components whose theoretical performance have been so plotted are those chosen to provide for a square wave pulse of about 700 microseconds duration.
Figs. 3, 4, and 5 are similar graphs upon which there have been plotted with respect to time the actual measured value of instantaneous current for applications of our invention to three illustrative square wave light pulse systems. The circuit is the same as that of Fig. 1 and actual values of R and L and C for each of these illustrative conditions are printed with each graph.

Referring to Fig. 1 by characters of reference, it may be noted that the circuit includes a source 1 of high voltage power which may be the conventional combination of transformer, rectifier, and bleeder resistor to dissipate unused charges. This source of power is utilized to charge the storage capacitors 2 and 3 which are respectively connected in series with an inductor 4 and a resistor 5. We provide a flash tube 6 of the gas-filled type capable of producing an intense light when an electrical discharge is passed between its anode and cathode terminals. An external or internal trigger electrode 7 is provided which may be energized to initiate the discharge.

Such a flash tube may, for example, consist of a xenon-filled, glass or quartz tube having anode and cathode terminals at its ends and coiled into a helix for concentration of the light. An exemplary tube of this type has been provided with an external trigger electrode surrounding several of the turns of the helix. The General Electric Company manufactures a number of suitable tubes, one of which may be identified as their flash tube FT–503.

When a suitable high voltage pulse—for example, one resulting from the discharge of a capacitor through the primary of a high ratio transformer, is applied to the triggering electrode 7, the flash tube 6 becomes conductive and the capacitors 2 and 3 commence to discharge through it.

Since the discharge path for capacitor 3 contains only resistive elements (the resistor 5 and the flash tube 6 which, while conducting, behaves as a resistance of about 5 ohms average value), the current from this capacitor 3 will, as soon as the tube becomes conductive, rise immediately to the greatest value permitted by the voltage on the capacitor and the resistance in series therewith and will then decay exponentially in the familiar curve of the RC network. The purpose of the resistor 5 is to limit the initial surge of current to a desired value and to control the rate of discharge during the rest of the cycle, as will be discussed hereinafter. Such a discharge characteristic is shown by the dot-dash curve in Fig. 2.

The discharge path for the capacitor 2 includes the inductor 4 which also has a small but finite resistance and the flash tube 6 which, as previously noted, behaves as a resistance of about 5 ohms. The current flowing in such a discharge path will, as is well known, tend to follow a damped oscillation and, if plotted with respect to time, will be defined by a damped sine wave. A plot of a portion of the first half cycle of such a characteristic curve is shown by the dashed line in Fig. 2. The primary purpose of the inductor 4 is to delay the discharge of capacitor 2, thus prolonging the flow of current through the flash tube and to limit the total current in this path to a maximum value consistent with the peak value of the current flowing from capacitor 3.

Since both currents flow simultaneously in the flash tube, the ordinates of the two curves corresponding to any given instant of time may be added, resulting in the solid line curve of Fig. 2 representing total current in the flash tube 6.

Examining this illustrative curve, it will be seen that the current value is within ±5% of an average value of 405 amperes for about 88% of a time period of 700 microseconds and that the current at the end of this same period has decreased to a value only about 11% less than average value. These figures are based on actual current measurements taken separately through each discharge path in the absence of the other discharge path and the curves have therefore been described as theoretical. It will be appreciated that the values to be measured are fleeting transients, are difficult to measure, and that the apparent resistance of the flash tube is in part a function of applied voltage or current. Hence, the total flash tube current measured with both capacitors discharging simultaneously may vary somewhat from conditions represented in Fig. 2.

For such photographic purposes as synchronized use with ultra high speed focal plane shutters, the principal requirement is uniformity of illumination during the exposure interval, and the decreasing light resulting from the decreased current after the first quarter cycle of the damped sine wave has been completed is of no concern. However, for use with ultra high speed motion picture cameras, it is desirable to terminate the light as abruptly as it started and it will be noted that an abrupt termination of the current in the flash tube at the point marked "x" would result in a curve of flash tube current vs. time which is essentially a square wave and, since the instantaneous light intensity has been found to be substantially directly proportional to current at any given instant, the light intensity with respect to time is also a square wave function.

The function of the shunt tube 8 is to provide such an abrupt termination of the flash tube current, which it does by providing a shunt path of very low resistance and of ample current carrying capacity to absorb the remaining charge in the capacitors. The primary requirements of the shunt tube are (1) that its flash over voltage in the non-conducting state be higher than any transient voltage which may exist across the flash tube; (2) that its internal resistance be no greater and preferably much lower than the internal resistance of the flash tube; (3) that it be capable of carrying for a short time currents which may approach 1000 amperes; and (4) that it be provided with a control electrode which will permit it to be actuated at a desired time. In smaller installations these requirements can probably be met by some gaseous or mercury vapor tube such as the "Thyratron," but for a heavy duty installation we prefer a mercury pool cathode type of tube having an igniter of some substance such as boron carbide projecting into the mercury pool. Such tubes are available from the General Electric Company under the name "Ignitron."

Again referring to Fig. 1, it may be seen that we provide a trigger unit 9 which preferably includes a charged condenser arranged to discharge in series through a gas tube, such as a "Thyratron," and the primary of a step-up transformer having a secondary connected to the trigger electrode 7 on the flash tube. Such trigger units are of well-known construction and the gas tube therein may, as is also well known, be arranged to be fired in response to mechanical closing of a switch, to interruption of a light beam, to sound impinging upon a microphone, or to electrostatic or electromagnetic impulses resulting from the passage of an object, as particularly well known in the ballastics field. This trigger unit has the function of initiating the discharge in the flash tube at the exact time it is desired to commence the illumination of the subject.

The trigger unit may also be used advantageously to initiate the operation of a time delay pulse circuit 10. Such time delay circuits are commercially available, frequently in the form of counter instruments which count the number of cycles of a precision oscillator and which are provided with circuits permitting them to start counting at a start signal and to generate a signal pulse at the end of any pre-set number of cycles. A suitable instrument is the Potter Preset Interval Timer, Model 75, manufactured by the Potter Instrument Company, Flushing, New York, or the Time Delay Generator, Model A-2, manufactured by the Rutherford Electronics Company of Culver City, California. The Sweep Calibrator, Model G. L. 22A, manufactured by the Browning Laboratories, Inc., of Winchester, Mass., can also be adapted to this service.

The signal pulse so generated is used to trigger a gas or mercury vapor tube such as a "Thyratron" which, like the trigger unit, applies a triggering impulse to the control electrode 11 of the shunt tube 8. With a mercury pool type tube, the triggering impulse on the igniter electrode 11 may be that resulting from the discharge of a 2 mfd. condenser at about 250 volts through a "Thyratron" triggered by the interval timer.

In a typical square wave installation we have found it suitable to use as the flash tube 6, a General Electric flash tube No. FT-503 operating at a potential of 4,500 volts. The capacitors 2 and 3 were each of 50 microfarads capacity and of the appropriate voltage rating. The shunt tube 8 was a General Electric "Ignitron" Type G. L. 5550. Tapped inductances and resistors were arranged with suitable gang switching to provide for square wave pulses of several different lengths.

Figure 6:
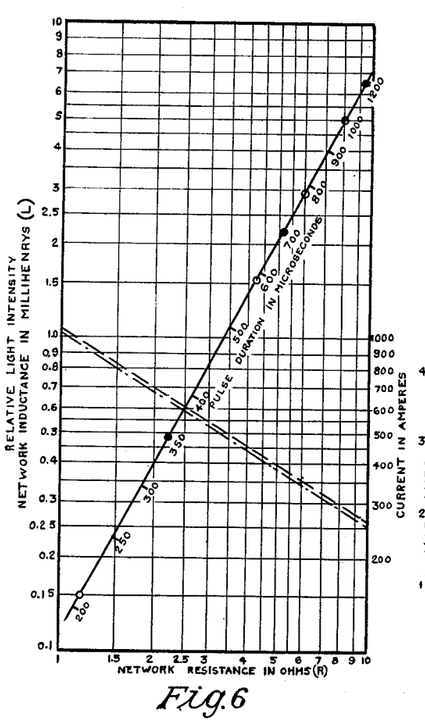
Fig. 6 is a graphical diagram useful in selecting the network parameters for any given duration of square wave pulse, including also an indication of the values of average current and relative light intensity to be expected from the equipment.

Fig. 6 is a diagram which is useful in selecting the appropriate values for the indicator 4 and resistor 5 in a circuit such as shown in Fig. 1 to operate at any desired time interval over a fairly wide range. On this diagram a time scale is plotted on the solid diagonal line, while the vertical scale represents inductance in millihenries and the horizontal scale represents resistance in ohms. Selecting any particular time as the duration of the square wave pulse desired, the horizontal projection of the selected time will show the appropriate inductance while the vertical projection will show the appropriate resistance to be used.

The dashed line plotted on this diagram may be used in conjunction with the right hand vertical scale of current to find the approximate level of average current which will flow in the flash tube during the square wave interval. This value may be determined by vertically projecting the selected time to its intersection with the time scale and horizontally projecting that intersection to the current scale.

The dot-dash line on Fig. 6 may be used in the same manner as the current scale to obtain an approximation of the average light intensity during the square wave pulse. The units in which light intensity is plotted are arbitrary and approximate; their relationship to any defined physical units has not been determined.

Fig. 3 is a graph showing actual currents through the flash tube with the component values selected from Fig. 6 for a time interval of 1200 microseconds, inductor 4 having the value of 6.40 millihenries, and resistor 5 a value of 9.5 ohms. Conduction in the flash tube was initiated by a trip circuit 9 and terminated by the firing of the shunt tube 8 under control of the time delay circuit 10. Oscillographic records of current were recorded and simultaneously a drum camera was exposed to the light of the flash tube. This drum camera comprised a narrow slit covered by a step tablet or filter of a density increasing stepwise along the length of the slit. Behind this slit a film covered drum was rotated at a constant speed. Thus, the number of steps visible on the exposed film was a measure of the instantaneous light intensity and the length of the record along the circumference of the drum of the camera was a measure of time. Within the limits of the photographic technique employed, the intensity of the light did not vary appreciably during the 1200 microsecond interval and rise and extinction times were on the order of 10 microseconds or less.

Examining the oscillographic record of flash tube current, it may be seen that the current was within ±5% of the value predicted from Fig. 6 for about 70% of the 1200 microsecond interval, within −10% for 78% of that interval, and at the end of that interval had fallen only about 18% below the predicted value. Since the major part of the variation occurred at the end of the 1200 microsecond interval, it is apparent that shortening the time interval, for example, to 1000 microseconds, could result in reducing the amount by which the final current falls below the predicted value. This is not necessary, however, for the drum camera records failed to show an appreciable decrease in light intensity, and a variation of less than 20% in light intensity is well within the variations inevitably encountered in more significant factors such as camera speed, film calibration, and development techniques.

Figures 4, 5, 7:
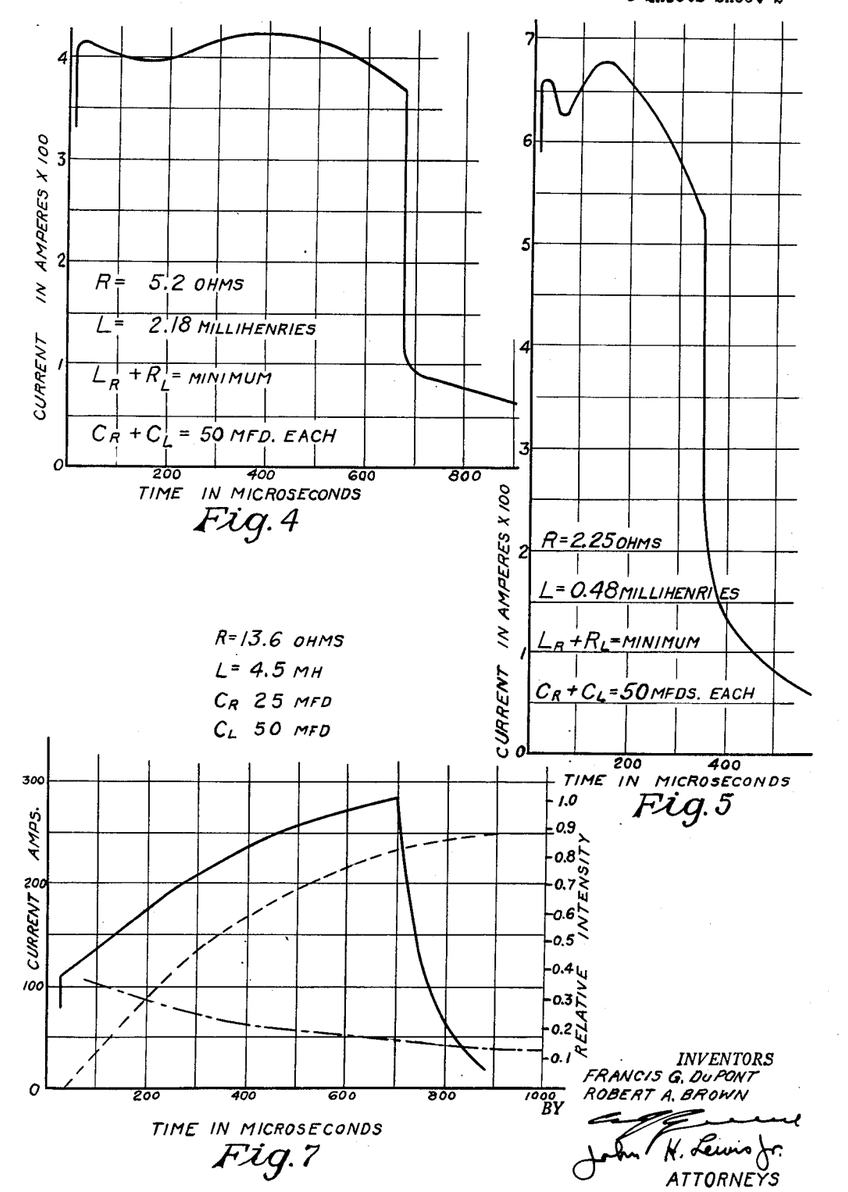
Figs. 7 and 8 are diagrams similar to Figs. 3, 4, and 5, showing applications of our invention respectively to a light pulse of amplitude increasing in intensity with respect to time and to a light pulse decreasing in intensity with respect to time. Again, the circuit is that of Fig. 1, and exemplary values of R and L and C to produce such conditions are printed on each graph.

Similarly, Fig. 4 shows performance with component values selected from Fig. 6 for a time interval of 700 microseconds. In this case, the inductor 4 had a value of 2.18 millihenries and the resistor 5 a value of 5.2 ohms. Again, the drum camera records showed square wave performance with rise and extinction times not substantially over 10 microseconds. In this instance, the oscillographic current record seems to indicate a current slightly larger than that predicted from Fig. 6 but, even so, the actual current was within ±5% of the predicted value for 55% of the 700 microsecond interval, within ±10% for about 98% of that interval, and had a maximum variation of −11%. Within the limits imposed by our equipment and experimental technique, the light intensity seemed to bear substantially the relation to that obtained with the Fig. 3 setup which would be predicted by the intensity line on Fig. 6.

Fig. 5 provides actual performance data on component values selected from Fig. 6 as appropriate for a time interval of 350 microseconds. In this case, inductor 4 had a value of 0.48 millihenries and resistor 5 a value of 2.25 ohms. As before, drum camera records indicated square wave light intensity and the oscillographic record of current showed actual currents within ±5% of the indicated average for about 70% of the time interval, within ±10% for about 80% of that interval, and a maximum variation of about —19%. As in the case of Fig. 3, the maximum variation was at the end of the cycle and could have been eliminated, if desired, by an earlier termination of the current in the flash tube.

The three tests referred to above have been selected from many which were run as examples of the performance of units constructed with component values selected from the diagram of Fig. 6 and indicate good compliance of actual current values with those predicted from Fig. 6. Within the limits of our photographic technique, it also appears that the relationship of relative light intensity is about that indicated in Fig. 6. Numerical ratios of light intensity between various setups are, however, not of much importance, for the typical unit will be designed for use at probably not more than three or four different time intervals such as those specifically discussed herein. A relatively few test exposures at each speed will, in a known manner, readily establish guide numbers which may thereafter be used to determine exposure data for exposures under other conditions. The significant point to note is that with such a circuit it has been shown that for each condition tested light intensity rises to a maximum value in about 10 microseconds, may be made to remain constant within photographically acceptable limits for periods longer than one millisecond, and is extinguished below limits of photographic effectiveness within about 10 microseconds.

To provide a practical example of a situation in which light pulses of both increasing and decreasing intensity with respect to time might be utilized, the problem of studying photographically the spin and stability characteristics of a moving bullet may be used as an example. Assume a bullet such as the well-known .30-30 which, at a convenient range, may, for example, in a period of 700 microseconds, travel 18 inches and rotate about one and one-half revolutions. Such a subject can best be photographed with the camera set up at right angles to the trajectory and opposite the midpoint of the chosen 18" section of the trajectory. The use of two lights set up to give a portrait type of modeling light will assure optimum definition, but such modeling with static lights could only be correct for one given position. With static modeling, a degree of distortion would be introduced which would defeat the purpose of the study. If the lights can be controlled so that their intensity varies with time in the same ratio as the variation of the square of the distance from lights to bullet, the modeling ratio at the bullet and the total light reflected from the bullet may remain substantially constant and the photographs will have optimum clarity and definition.

Figure 9:
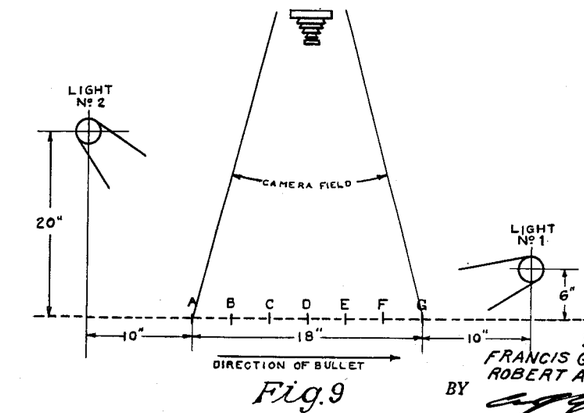
Fig. 9 is a schematic diagram of a lighting set-up for an illustrative problem utilizing the components of Figs. 7 and 8.

Referring to the setup shown in Fig. 9, to maintain constant modeling of an object moving in the direction shown, light No. 1 must decrease in intensity in proportion to the square of the instantaneous distance to the bullet being photographed, while light No. 2 must increase in intensity in the same ratio. Computing light intensity $i$ at each of the points indicated in Fig. 9, the lights should theoretically vary substantially as set forth in the following tabulation:

| Light Source | $i_A$ | $i_B$ | $i_C$ | $i_D$ | $i_E$ | $i_F$ | $i_G$ |
|---|---|---|---|---|---|---|---|
| No. 1 | 1.00 | .81 | .64 | .49 | .36 | .25 | .17 |
| No. 2 | .42 | .48 | .55 | .64 | .75 | .87 | 1.00 |

Obviously, these intensity ratios will hold for any desired length of time over which they must be uniformly distributed. The intensity values for lamp No. 1 are plotted in the short dashed straight line of Fig. 8 for the 700 microsecond period of the example chosen, and the same information for lamp No. 2 is plotted as the short dashed straight line in Fig. 7. In each of these figures the dot-dash line represents the current flowing from capacitor 3 through resistor 5 and the long dash line represents the current flowing from capacitor 2 through inductance 4. The full line represents the sum of these currents or the total current flowing through the flash tube 6 after it has been caused to become conductive by energizing the trigger electrode 7. In both cases, the pulse was terminated at the end of the desired time by dumping the remaining charge on capacitors 2 and 3 through the "ignitron" 8 energized in the usual way by igniter electrode 11.

Figure 8:
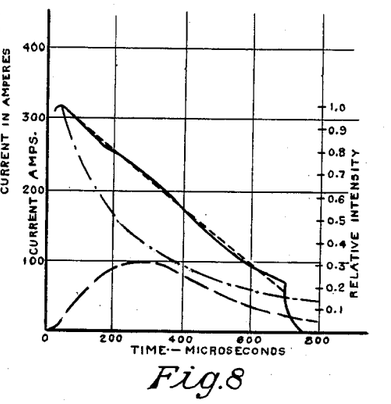

As has been previously shown, the light intensity emitted by the flash tube is proportional to the current passing through it. It should be apparent by comparison of the short dash lines of Figs. 7 and 8, representing desired intensity ratios, with the full lines representing flash tube current that the actual light outputs of the tubes closely approach those theoretically determined to be necessary for maintaining a constant modeling ratio on an object traversing 18 inches in 700 microseconds. Light pulses may be similarly tailored to match any predetermined desirable lighting condition, and the component values shown in Figs. 7 and 8 are only illustrative of those which, with the particular FT-503 flash tubes we employ, seem to give optimum results for this condition.

In regard to details of construction, a few suggestions may be in order although most of them relate to points which should be relatively obvious to those skilled in the art. It is essential to remember that very high voltages are utilized and that the capacitors employed are of large capacity and capable of delivering dangerously high currents. Suitable precautions must therefore be taken to provide adequate insulation and to protect personnel from the arcs and spray of incandescent metal which may result from a burnout in any part of the circuit. However, since these currents exist for only a very short time, the thermal capacity or specific heat of the metal employed as conductors may be relied upon to reduce the indicated size of conductors. The resistors, for example, do not have to be proportioned for continuous dissipation of the power indicated by the product of $I^2R$.

It is probably obvious that, for most applications, the resistors should be wound in such a way as to minimize their inductance and that the inductances should be wound of material having a low resistance. If tapped inductances are used with a switching system to provide a selection of time intervals, it must be remembered that an auto-transformer effect, when using the lower values of inductance, may result in the appearance of extremely high voltages across the extreme terminals of the coils. To avoid core saturation problems, air core inductors are deemed preferable.

In addition to the insulation and personnel protection previously discussed, it may be noted that unless precautions are taken to provide electrostatic and electromagnetic shielding, the transient currents involved in this apparatus may be reflected in other equipment. Ballistic measuring instruments such as chronographs, interval timers, and various oscillographic instruments are particularly susceptible to such pulses. Accordingly, good shielding is desirable and necessarily exposed leads such as those connecting the power supply to the flash tube are preferably well insulted coaxial cable to cut down radiations.

Although we have illustrated and quite specifically described an illustrative unit embodying our invention, we contemplate that our invention is limited only by the scope of the claims appended hereto.

We claim:

1. A light generator comprising a flash tube having an anode and a cathode; a current supply system for said flash tube including two or more combinations of circuit elements, each of said combinations of circuit elements being connected in parallel with each of the other of said combinations of circuit elements across the anode and cathode of said flash tube, each of said combinations of circuit elements including a charged supply capacitor and one or more discharge controlling impedance elements connected in series with that capacitor; and means to cause said flash tube to become conductive and to pass a current which is the sum of the discharge currents of the several parallel connected combinations of circuit elements.

2. A light generator as described in claim 1, said impedance elements being selected to modify the discharge characteristics of the capacitors with which they are in series in such a fashion that the combined discharge current of the several combinations will vary with respect to time in a predetermined manner.

3. A light generator as described in claim 2, the impedance elements in at least one of said combinations being primarily inductive to delay the discharge of the capacitor with which it is in series and thereby prolong the interval in which the combined discharge currents are effective to maintain luminosity in the flash tube.

4. A light generator as described in claim 3, the impedance elements in at least one of said combinations being substantially purely resistive to provide for substantially instantaneous starting of the flow of current when said flash tube becomes conductive and to limit the peak value of said starting current.

5. A light generator comprising a flash tube having an anode and a cathode; a combination including a charged capacitor and an inductor connected in series with each other in a circuit interrupted by the anode and cathode of said flash tube; a second combination including a charged capacitor and a resistive element connected in series with each other, said second combination being connected in parallel with said first combination in the circuit interrupted by the anode and cathode of said flash tube; and means to cause said flash tube to become conductive, thereby permitting said charged capacitors to discharge simultaneously through said flash tube.

6. A light generator as described in claim 5, said inductor and said resistive element having such values of impedance in relation to the charges on said capacitors that, during the first quarter cycle of damped oscillation of said first mentioned combination, the increase in current flowing from said first mentioned combination will be substantially balanced by the exponential decrease of current flowing from said second combination to provide during said first quarter cycle a substantially uniform current in the flash tube.

7. A light generator comprising a flash tube having an anode, and a cathode; a combination of a charged capacitor and an inductor connected in series with each other in a circuit interrupted by the anode and cathode of said flash tube; a second combination of a charged capacitor and a resistance element connected in series with each other, said second combination being connected in parallel with said first combination in the circuit interrupted by the anode and cathode of said flash tube; means to cause said flash tube to become conductive, permitting said capacitors to simultaneously discharge through said flash tube; a shunt tube, which in the nonconductive state has a higher flash-over voltage than the working voltage of the flash tube and in the conductive state has a relatively low internal resistance, connected in shunt relation across said flash tube; and means to cause said shunt tube to become conductive and divert the current from said flash tube at a desired time interval after said flash tube has become conductive.

8. A light generator as described in claim 7, the inductive and resistive elements in said combinations having such impedances in relation to the charges on the capacitors that during the first quarter cycle of damped oscillation of said first combination the increase in current flowing from said first combination will be substantially balanced by the exponential decrease of current flowing from said second combination to provide during said first quarter cycle a substantially uniform total current level in the flash tube.

9. A light generator as described in claim 8, said means to cause the shunt tube to become conductive being constructed and arranged to operate at a desired time after the time the total current in the flash tube reaches said uniform level and before the total current has dropped more than about twenty percent from said uniform level during the second quarter cycle of damped oscillation of said first combination.

10. A light generator as described in claim 7, said means to cause the flash tube to become conductive including an electrical trigger pulse generator, and said means to cause the shunt tube to become conductive including an electrical time delay device started in operation in predetermined time sequence to the operation of said means for causing the flash tube to become conductive.

11. A light generator as described in claim 7, said means to cause the flash tube to become conductive including a control electrode for said flash tube; an electrical trigger pulse generator; and means to apply the pulse from said generator to said control electrode.

12. A light generator as described in claim 11, said means to cause the shunt tube to become conductive including an electrical time delay device; means to apply the trigger pulse from said generator to said time delay device to initiate the operation thereof; an electrical igniter pulse generator operable at the expiration of the desired time delay to generate an igniter pulse; a starting electrode for said shunt tube; and means to apply said igniter pulse to said starting electrode.

13. A light generator as described in claim 12, said flash tube comprising a transparent gas-filled tube having the said anode and cathode electrodes disposed adjacent the extremities of the tube and said control electrode being disposed adjacent one of said other electrodes.

14. A light generator as described in claim 13, said shunt tube including a mercury pool cathode and said starting electrode including a conductive crystalline substance which projects into said mercury pool but is not wet by it.

References Cited in the file of this patent

UNITED STATES PATENTS

| Number | Name | Date |
|---|---|---|
| 2,464,188 | Spink | Mar. 8, 1949 |